United States Patent

[11] 3,582,142

| [72] | Inventor | Paul E. Titus |
| | | Houston, Tex. |
| [21] | Appl. No. | 802,614 |
| [22] | Filed | Feb. 26, 1969 |
| [45] | Patented | June 1, 1971 |
| [73] | Assignee | Shell Oil Company |
| | | New York, N.Y. |

[54] GAS INJECTION ARRANGEMENT FOR RESUSPENDING SETTLED SOLIDS IN SHUTDOWN SLURRY PIPELINE
5 Claims, 4 Drawing Figs.

[52] U.S. Cl..................................................... 302/14,
302/64, 302/66
[51] Int. Cl...................................................... B65g 53/30

[50] Field of Search............................................ 302/14, 24,
26, 64, 66

[56] References Cited
UNITED STATES PATENTS

| 562,232 | 6/1896 | Miller........................... | 302/14 |
| 1,335,205 | 3/1920 | Smith............................ | 302/26 |
| 1,465,269 | 8/1923 | Horn et al..................... | 302/24 |

*Primary Examiner*—Andres H. Nielsen
*Attorneys*—Thomas R. Lampe and McCarthy

ABSTRACT: Method and apparatus for facilitating the resuspension of settled solids in a shutdown slurry pipeline. Small amounts of gas under high pressure are explosively vented or injected into a pipeline at selected locations to loosen compacted slurry solid phase material to facilitate its resuspension in the liquid phase upon pipeline restart.

PATENTED JUN 1 1971
3,582,142
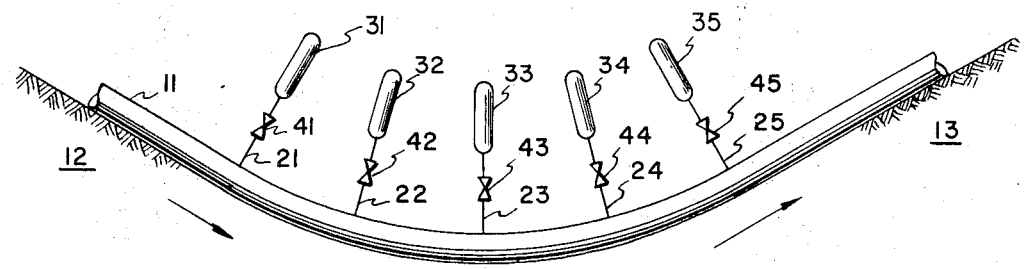
FIG. 1
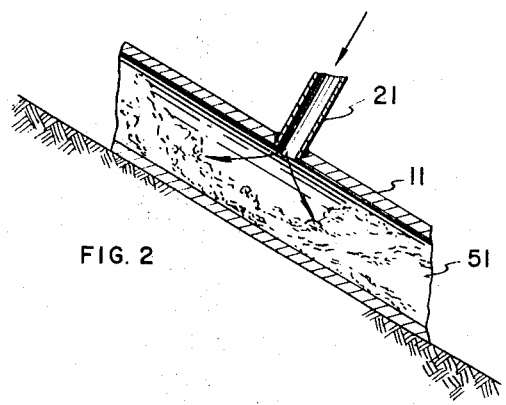
FIG. 2
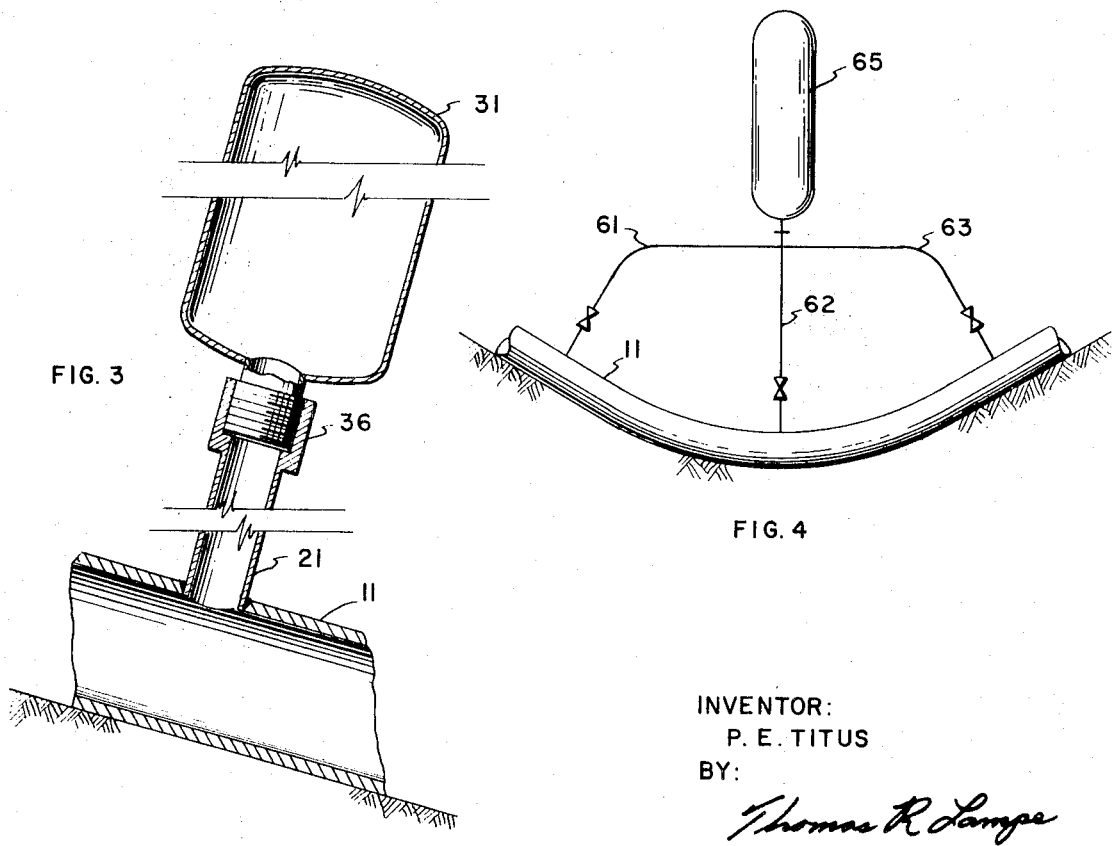
FIG. 3
FIG. 4
INVENTOR:
P. E. TITUS
BY:
*Thomas R. Lampe*
HIS ATTORNEY

GAS INJECTION ARRANGEMENT FOR RESUSPENDING SETTLED SOLIDS IN SHUT-DOWN SLURRY PIPELINE

The present invention relates to pipeline transport operations; and, more particularly, to a method and apparatus for facilitating the resuspension of slurry solids which have slumped in an inclined portion of pipeline and compacted during a shutdown period.

Transportation by pipeline is a major and growing industry. With the use thereof formerly confined almost entirely to movement of water, gas and petroleum products, pipelines, with the advent of slurry transport, have become useful for long and short hauls of a wide variety of raw materials and finished products.

With respect to the pipeline transportation of materials in slurry form, problems arise when such materials are moved through pipelines inclined to go over a hill or down into a valley. At these locations, during a planned or emergency line shutdown, the solids of the transported slurry may settle out vertically and subsequently slide down the inclined portions of the pipeline, thereby causing a compacted plug which may be very difficult to dislodge and move when line shutdown is terminated and transport activities are resumed.

These difficulties are most commonly avoided by laying solids-carrying or slurry pipelines so that they do not exceed a slope or angle of inclination below which sliding does not occur. Alternatively, the inclined pipeline sections are emptied at each shutdown. Obviously, these alternative prior art approaches are not always feasible or economical, especially in those situations where long and relatively steep slopes are encountered. Slopes of this nature are being encountered with increasing frequency as pipeline operations are being extended to new, relatively inaccessible mountainous areas in the United States and elsewhere.

SUMMARY OF THE INVENTION

It is therefore a primary object of the present invention to provide an improved and economical apparatus and method whereby slurry material being transported in an inclined pipeline section may be readily started after a line shutdown.

This and other objects have been attained in the present invention by providing a method and apparatus for facilitating the resuspension of settled solids in a shutdown slurry pipeline wherein gas inlet pipes are located at predetermined intervals along portions of the pipeline where slumping and compacting by slurry solid phase material is likely to occur. Gas is supplied under high pressure from any suitable source such as supply tanks and is explosively vented into the pipeline through the gas inlet pipes when restart is desired to loosen the material in any solid phase plug which may have been formed in the line, thus facilitating its resuspension.

DESCRIPTION OF THE DRAWING

The above-noted and other objects of the present invention will be understood from the following description, taken with reference to the accompanying drawing. In describing the invention in detail, reference will be made to the drawing in which like reference numerals designate corresponding parts throughout several views in which:

FIG. 1 is a diagrammatic view illustrating a given length of slurry pipeline which has been modified in accordance with the teachings of the present invention;

FIG. 2 is an enlarged cross-sectional view in longitudinal projection illustrating an inclined portion of the pipeline section of FIG. 1 with a high-pressure gas inlet pipe in operative association therewith in accordance with the teachings of the present invention;

FIG. 3 is an enlarged diagrammatic view illustrating details of a gas inlet pipe and gas supply source; and FIG. 4 is a diagrammatic view illustrating an alternative arrangement in accordance with the teachings of the present invention.

Referring now to FIG. 1, a given length of slurry pipeline 11 is illustrated in the position assumed thereby as the pipeline proceeds to and from a valley formed between two hills or mountains 12 and 13. The terrain illustrated is typical of that encountered in pipeline laying activities, although it should be understood that the teachings of the present invention may be carried out in any topographical configuration wherein a portion of slurry pipeline is inclined.

The transportation of slurries consisting of solid particles in a fluid medium by use of pipeline similar to that disclosed in FIG. 1 is quite well known, and such expedient is finding increasing use, especially in those situations where the source of raw materials is relatively remote and inaccessible from the point of delivery, which may be a suitable processing plant, for example. In the disclosed arrangement, it may be assumed for purposes of illustration that the slurry material being transferred through pipeline 11 as by means of conventional pumps (not shown) is moving through the line in the direction indicated by the arrows. However, the teachings of the present invention are, of course, applicable regardless of the direction of flow of the slurry.

As long as flow continues in the pipeline, the solid matter of the slurry will remain in suspension within the pumped liquid, even when the solid matter has a higher specific gravity than the liquid. If, however, the flow is stopped for any reason, i.e., the pipeline is shut down, such solid matter will settle out of suspension. In the situation where the line is horizontal or the slope of the line is insufficient to cause sliding of the settled solids, no problem is created by such settling out. Under these conditions, a liquid-rich channel remains open at the top of the line which allows the settled material to be resuspended with a minimum of difficulty upon resumption of slurry flow.

A serious problem can exist when the pipeline must be inclined to go over a hill or down a valley, as illustrated, for example, in FIG. 1. At these locations, the settling of solids followed by their sliding down the slope during a protracted shutdown can result in a compacted plug of material difficult, if not impossible, to move or resuspend. In the illustrated pipeline configuration, such solids would slide downwardly into the valley formed between hills or mountains 12 and 13. The solid material would then compact under its own weight to form a plug in the valley in an obvious manner.

Such plug formation is prevented in accordance with the teachings of the present invention as follows. A plurality of gas inlet pipes 21—25 are shown in FIG. 1 as being disposed in spaced relationship along pipeline 11. The number of such pipes will, of course, vary with the requirements of a given situation with such pipes being positioned in operative association with those sections of pipeline 11 where plug formation is likely to occur upon pipeline shutdown. Gas inlet pipes 21—25 provide communication between the interior of pipeline 11 and suitable sources of high-pressure gas which in the illustrated embodiment comprise high-pressure tanks 31-—35. One such tank, i.e., tank 31, is shown in FIG. 3 with the associated inlet pipe 21 being attached thereto as by means of a screw thread coupling arrangement 36, for example. Valves 41—45 are disposed in operative association with pipes 21-—25 to control gas flow therethrough. During slurry transport valves 41—45 are maintained in a closed condition with gas flow between pipeline 11 and tanks 31—35 being interrupted.

As stated above, it occasionally is necessary to shut down pipeline 11 for maintenance or other purposes. During shutdown, slumping and plug formation by the slurry solid phase may occur with the resulting plug being difficult or impossible to dislodge upon restart. In FIG. 2, such a plug is indicated by means of reference numeral 51. With the present arrangement, when pipeline restart is to be commenced, valves 41-—45 (FIG. 1) are opened to provide communication between tanks 31—35 and the interior of the pipeline with the high-pressure gas from the tanks being explosively vented or introduced into the line through the inlet pipes 21—25.

In FIG. 2, one such inlet pipe, i.e., inlet pipe 21, is illustrated with the flow of the high-pressure gas being illustrated by means of the arrows. The explosively vented or introduced gas loosens or breaks up the solid phase material comprising plug 51, thereby greatly facilitating resuspension of this material in the slurry liquid phase. By repeatedly opening and shutting valves 41—45 this explosive venting action is continued. Meanwhile, the pumps associated with pipeline 11 are restarted and slurry transport is resumed.

Rather than provide a separate high-pressure tank or source for each gas inlet pipe, a plurality of inlet pipes may be operatively associated with a single source. In FIG. 4, for example, three gas inlet lines 61, 62 and 63 are connected to a single high-pressure tank 65. As is the case with respect to the first-described arrangement, however, each gas inlet pipe is illustrated in FIG. 4 as having a valve associated therewith to allow individual inlet pipe control during the explosive venting operation. If desired, a single valve at the outlet of tank 65 could alternatively be utilized to introduce gas through all of the gas inlet pipes associated therewith.

While tanks have been shown, it should be understood that a wide variety of high-pressure gas sources may be utilized in carrying out the teachings of the present invention. For example, the explosive venting could be caused by the thermal expansion (remotely actuated) of a gas or volatile liquid to a pressure exceeding the capacity of a relief valve or rupture disc operatively associated with the inlet pipe. The gaseous medium introduced into the inlet pipe means is preferably one which is chemically inert with respect to the slurry material.

I claim:

1. Apparatus for facilitating the resuspension of settled solids in a shutdown slurry pipeline, said slurry having a solid phase and a liquid phase, said pipeline being inclined to the horizontal over at least a portion of its length and including an uppermost portion at one end of said inclined portion and a lowermost portion at the other end of said inclined portion where slumping and compacting of said solid phase is likely to occur under the influence of gravity upon pipeline shutdown, said apparatus comprising:

inlet pipe means communicating with the interior of said pipeline along a substantial portion of the pipeline where plug formation by said slurry solid phase is likely to occur due to slumping and compacting of the solid phase under the influence of gravity;

a source of high-pressure gas operatively associated with said inlet pipe means, said gas being chemically inert with respect to said slurry; and means disposed in operative association with said inlet pipe means and said source of high-pressure gas for selectively introducing said gas into said pipeline so as to loosen the solid phase material comprising the plug to facilitate the resuspension of said slurry solid phase in said liquid phase upon restart of said shutdown slurry pipeline.

2. The apparatus of claim 1 wherein said source of high-pressure gas comprises tank means affixed to said inlet pipe means.

3. The apparatus of claim 2 wherein said tank means comprises a plurality of separate high-pressure tanks and said inlet pipe means comprises a plurality of separate inlet pipes spaced along said pipeline and connected to said tanks.

4. A method for facilitating the resuspension of settled solids in a shutdown slurry pipeline, said slurry having a solid phase and a liquid phase, said pipeline being inclined to the horizontal over at least a portion of its length and including an uppermost portion at one end of said inclined portion and a lowermost portion at the other end of said inclined portion, where slumping and compacting of said solid phase is likely to occur under the influence of gravity upon pipeline shutdown, said method comprising:

selectively explosively introducing gas which is chemically inert with respect to said slurry under high pressure along a substantial portion of the lowermost portion of the pipeline where plug formation by said slurry solid phase is likely to occur due to slumping and compacting of the solid phase under the influence of gravity to thereby loosen the solid phase material comprising the plug to facilitate the resuspension thereof upon pipeline restart; and resuming slurry transport in said pipeline.

5. The method of claim 4 wherein said gas is introduced under high pressure into said pipeline at a plurality of locations spaced along said pipeline.